Figure 7:
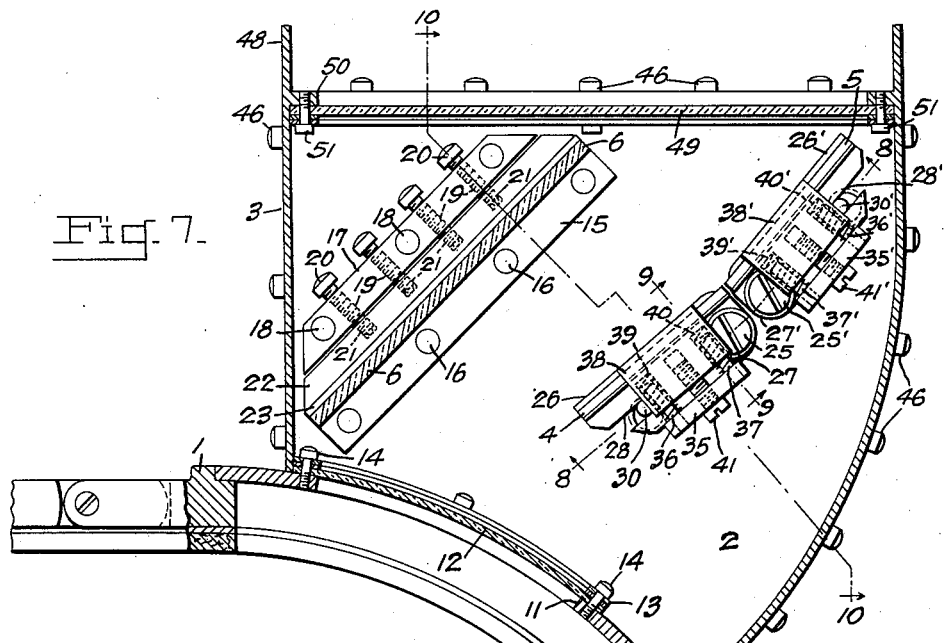

Nov. 1, 1949.    W. L. WHITSON    2,486,453
STADIA TYPE RANGE FINDER HAVING A TRANSPARENT
REFLECTOR AND TWO MIRRORS MAKING SMALL BUT
DIFFERENT FIXED ANGLES WITH THE REFLECTOR
Filed Aug. 18, 1945    3 Sheets-Sheet 1
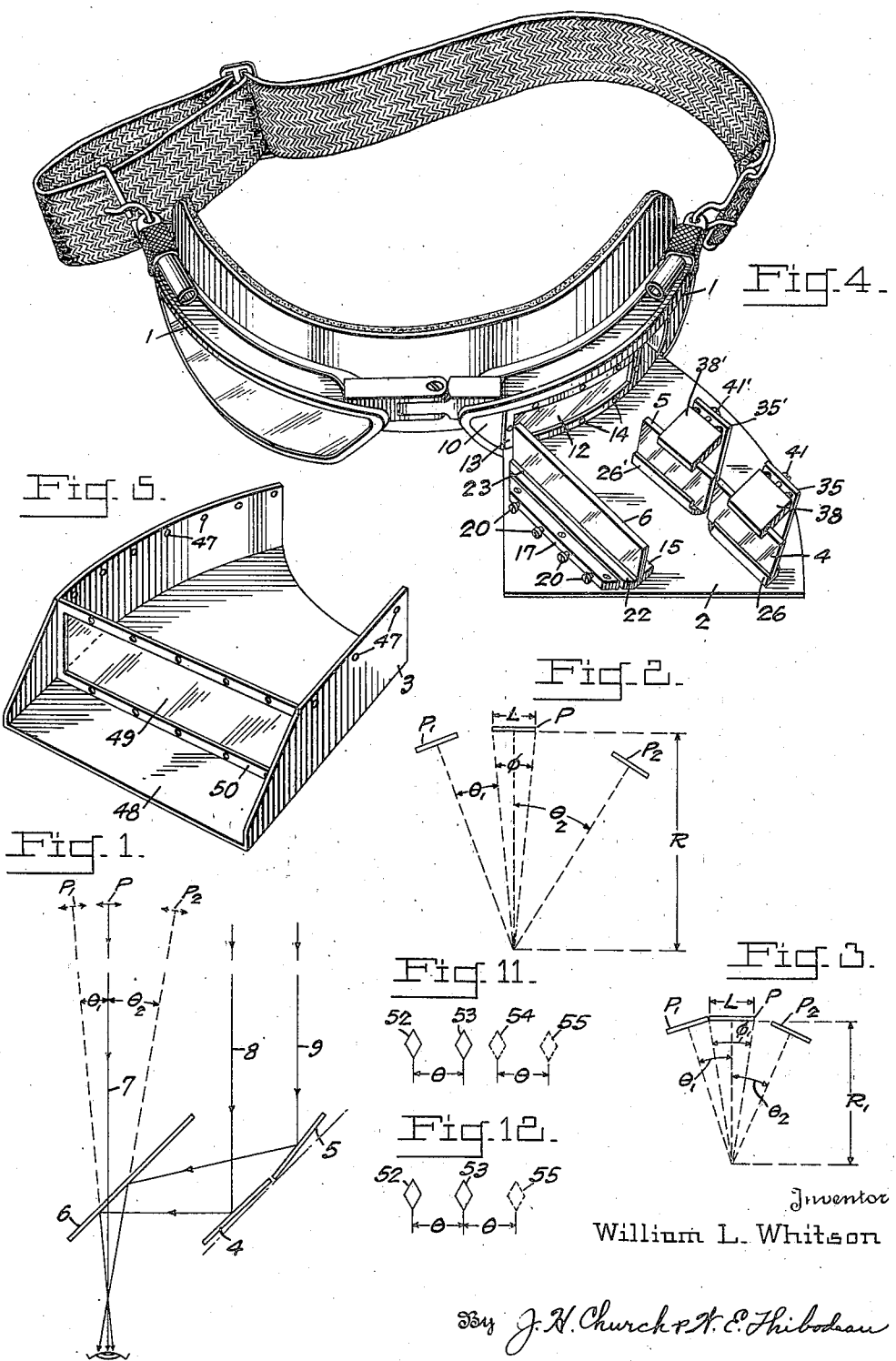
Inventor
William L. Whitson
By J. H. Church & W. E. Thibodeau
Attorneys Nov. 1, 1949.  W. L. WHITSON  2,486,453
STADIA TYPE RANGE FINDER HAVING A TRANSPARENT
REFLECTOR AND TWO MIRRORS MAKING SMALL BUT
DIFFERENT FIXED ANGLES WITH THE REFLECTOR
Filed Aug. 18, 1945  3 Sheets-Sheet 2
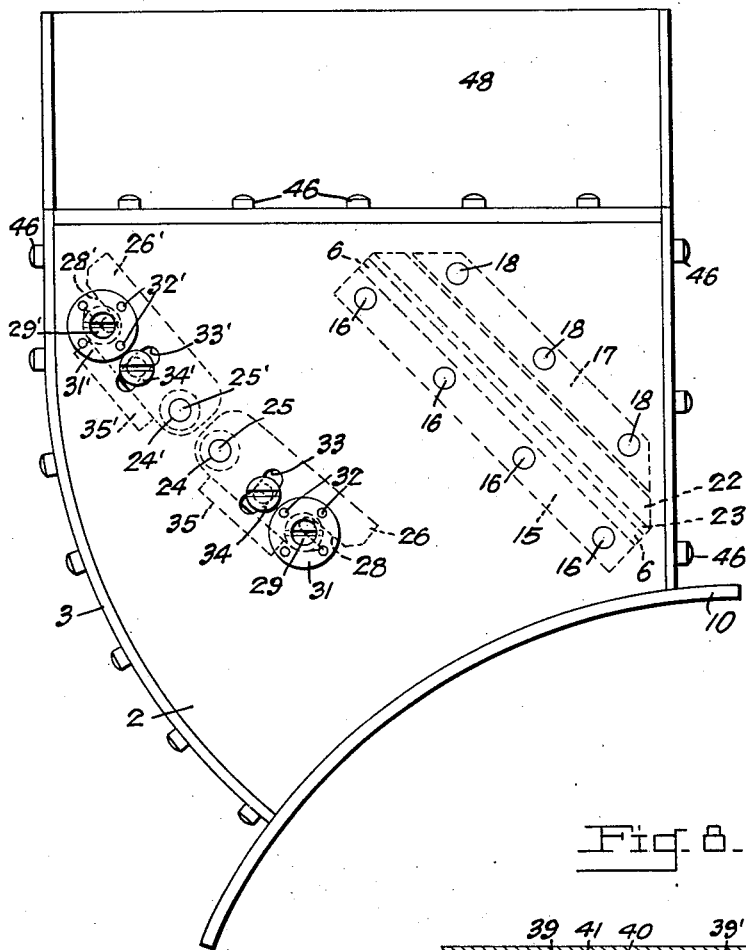
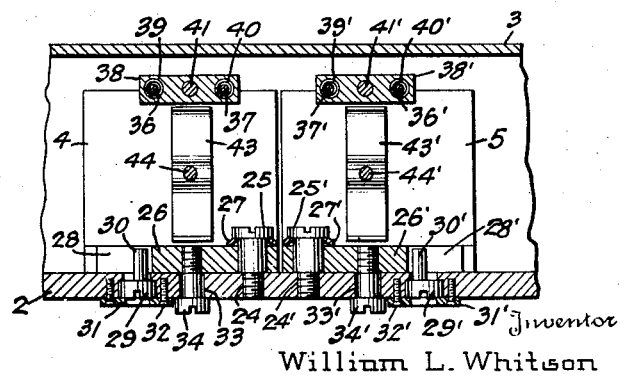
Inventor
William L. Whitson Nov. 1, 1949.
W. L. WHITSON
2,486,453
STADIA TYPE RANGE FINDER HAVING A TRANSPARENT
REFLECTOR AND TWO MIRRORS MAKING SMALL BUT
DIFFERENT FIXED ANGLES WITH THE REFLECTOR
Filed Aug. 18, 1945
3 Sheets-Sheet 3

Inventor
William L. Whitson
By J. H. Church & H. E. Thibodeau
Attorneys

UNITED STATES PATENT OFFICE 2,486,453

STADIA TYPE RANGE FINDER HAVING A TRANSPARENT REFLECTOR AND TWO MIRRORS MAKING SMALL BUT DIFFERENT FIXED ANGLES WITH THE REFLECTOR

William L. Whitson, Takoma Park, Md., assignor to the United States of America as represented by the Secretary of War Application August 18, 1945, Serial No. 611,435
6 Claims. (Cl. 88—2.4)

(Granted under the act of March 3, 1883, as amended April 30, 1928; 370 O. G. 757)

The invention described herein may be manufactured and used by or for the Government for governmental purposes without the payment to me of any royalty thereon.

This invention relates to range finders of the stadia type, and more particularly to such range finders in the form of goggles adapted to be worn upon the head. Each type and calibre of gun used upon aircraft has a range at which it is most effective so that in combat, the probability of effectively engaging and defeating an enemy aircraft is increased in case the engagement can be carried out at such range. Furthermore, the fixed guns of a fighter craft are adjusted relatively to the craft for the optimum range. Hence it is extremely desirable to provide a range finder that is simple and easy to use and which enables positive determination of the instant at which the optimum range has been reached and at which the guns will be most effective. It is also very desirable to be able to judge predetermined ranges in toss bombing.

It is therefore an object of the invention to provide an instrument adapted to be worn upon the head of the pilot or gunner that gives a positive indication when the craft is at the predetermined range from a target at which the guns will be most effective or the probability of a successful engagement in toss bombing will be greatest.

It is another object to provide a range finder that requires no adjustment after initial calibration so that one or more known ranges may be determined quickly and without diverting the attention of the pilot or gunner from the correct operation of the guns.

A further object is to provide a range finder of the type aforesaid, that may be calibrated upon the ground and that is affected very little by plane vibration.

A still further object is to provide a relatively simple range finder adapted to be worn upon the head and which may be easily adjusted to determine range of an object when said object has a known observable dimension such as the wingspread of an aircraft.

Other objects and advantages of my invention will become apparent as the description proceeds.

Figure 9:
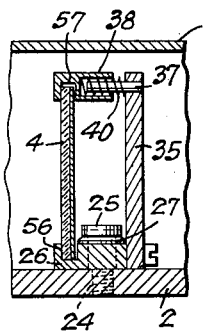
Figure 10:
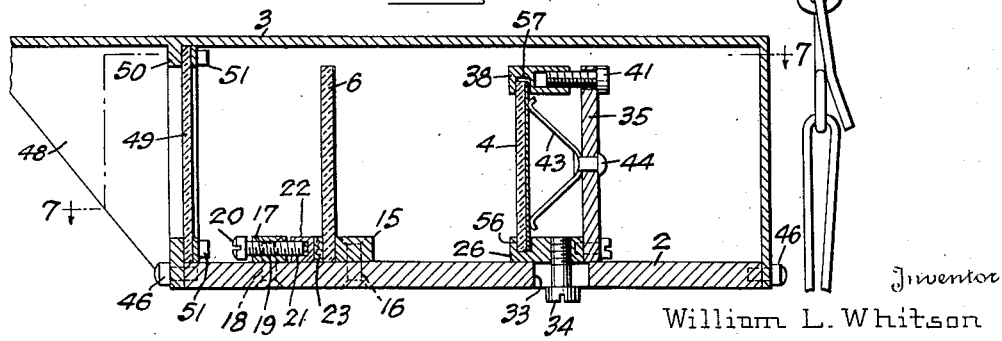

In the drawings:

Fig. 1 is a diagrammatic view showing the optical principles upon which the invention operates to determine two known ranges of an object, Fig. 2 is an optical diagram showing the apparent positions of the object and its two images before the predetermined range has been reached, Fig. 3 is an optical diagram corresponding to Fig. 2 but showing the apparent relative positions of the object or target and its images at the instant that one predetermined range has been reached, Fig. 4 is a perspective view of the invention as applied to a pair of goggles, the cover or casing being removed to show the arrangement of the optical parts, Fig. 5 is a perspective view of the cover or casing for protecting the optical parts and shown in inverted position, Fig. 6 is a bottom plan view of the base plate supporting the optical parts and showing more particularly the arrangement of pivot screws and adjusting elements for angularly adjusting the total reflection mirrors and securing them in adjusted position, Fig. 7 is a sectional plan view of the optical elements of the instrument as seen with the cover of Fig. 5 removed and taken upon a plane indicated by line 7—7, Fig. 10, Fig. 8 is a section taken upon the line 8—8, Fig. 7 and showing in enlarged detail the construction whereby the totally reflecting mirrors may be pivotally adjusted and locked in the desired position of adjustment, Fig. 9 is a section taken upon the line 9—9 of Fig. 7 and showing the mounting bracket for the mirrors, together with the means for holding them in true perpendicular relation with the supporting base, Fig. 10 is a section taken upon the line 10—10 of Fig. 7 and showing details of the mounting for the partly silvered mirror and one adjustable reflector, Fig. 11 is a view showing the appearance of a pair of calibration targets as seen through the range finder prior to calibration thereof and from a measured range desired to be indicated by the instrument, and Fig. 12 shows the appearance of the targets from the same point when viewed through the range finder subsequent to correct calibration.

*Theory of operation*

Referring to Fig. 1, 6 represents a partially-silvered mirror and 4 and 5 represent a pair of totally reflecting mirrors positioned at a small angle to each other and to mirror 6 so that an object P may be seen directly through mirror 6 as well as two images $P_1$ and $P_2$. If the distance from the mirrors to the object P is large in comparison to the distances between the mirrors, the rays coming from any point upon the object will enter the eye so that ray 7 is undeviated while rays 8 and 9 will be deviated through the angles $\theta_1$ and $\theta_2$, respectively, to create the images $P_1$ and $P_2$.

Referring to Fig. 2, the angular extent $\phi$, measured in mils of a known dimension L of the object is substantially given by $$\phi = \frac{L}{R} \times 1000 \qquad (1)$$

As the range R decreases, the value of $\phi$ increases and the said dimension appears to expand or grow larger. As the values of $\theta_1$, and $\theta_2$ do not vary, being dependent upon the fixed angular relation between the mirrors 4, 5 and 6, the images appear to approach and to touch the object at one definite distance for one image and at a second definite distance for the other image. When the instrument is so located that one end point of the dimension L of the actual object appears to touch the corresponding adjacent point of an image, the object and image are said to be in conjunction.

Fig. 3 shows the object P and image $P_1$ in conjunction to thereby determine a definite range $R_1$ in accordance with Equation 1. As the range finder continues to approach the object the adjacent end points of object P and image $P_2$ will appear to approach and touch at a second predetermined range $R_2$. In each case of conjunction, Equation 1 is applicable so that $$\phi_2 = \frac{L}{R_1} \times 1000 \qquad (2)$$

and $$\phi_2 = \frac{L}{R_2} \times 1000 \qquad (3)$$

Dividing (3) by (2) gives the result $$\frac{\phi_2}{\phi_1} = \frac{R_1}{R_2} = \text{a constant} \qquad (4)$$

Thus for a particular setting of mirrors 4 and 5, the ratio of the ranges determined by the instrument, will remain constant irrespective of the absolute value of dimension L.

In a preferred form, the range finder of my invention is incorporated into a pair of goggles having the conventional head band and interpivoted eye sections 1 with removable panes or lenses. As shown in Figs. 4 and 7, one of these panes is replaced by a correspondingly shaped frame 10 having a sighting opening 11 over which a pane 12 of protective transparent plastic is secured, as by a binding frame 13 and screws 14. A base plate 2, shaped as clearly shown upon Figs. 6 and 7, is formed integrally with, or rigidly attached to frame 10 and defines a plane substantially parallel to the line of sight of the user through opening 11.

A partially silvered or aluminized reflecting mirror 6 is mounted upon base plate 2 perpendicularly thereto and at substantially 45° to the line of sight. As shown upon Figs. 7 and 10, mounting may be conveniently effected by a backing strip 15 secured to plate 2 by rivets 16. A second strip 17 is also secured to plate 2, as by rivets 18, so as to be spaced from and parallel to strip 15. A series of tapped holes 19 parallel to each other and to plate 2 are formed in strip 17. Clamping screws 20 are threaded into these holes so that their ends fit within bores 21 in a clamping strip 22 having a resilient facing 23 of felt or similar material secured thereto. The dimensions and relations are such that when screws 20 are backed off, mirror 6 may be inserted into the groove between strips 15 and 22, whereupon screws 20 may be turned down to firmly clamp the mirror in the desired position perpendicular to the plane determined by plate 2. The mirror 6 is thus secured in position so that an object or target such as an enemy aircraft, may be viewed therethrough while, at the same time, one or more images of such object may be seen projected onto said mirror by means now to be described.

In view of the fact that the two reflectors and their mounting mechanism, are mirror copies of each other, a description of one will suffice. A tapped hole 24 is formed in plate 2, to receive the reduced threaded end of a pivot screw 25. A base block 26 is pivoted upon screw 25 and is urged into contact with plate 2 by a spring washer 27. Block 26 has a slot 28 therein extending radially of the axis of screw 25. An adjustment element 29 has a slotted head rotatably fitting a hole in plate 2 beneath slot 28 and an eccentric shank 30 fitting within slot 28 so that the block 26 may be given a fine adjustment about the axis of screw 25, by inserting a screwdriver into the slot of, and turning, element 29. A washer 31 has its central aperture slightly smaller than the head of element 29 and is secured by plugs or screws 32 to the outside of plate 2 concentric of said element 29 to prevent loss of adjustment element 29. An arcuate slot 33 (Fig. 10) is formed in plate 2 concentric of the axis of hole 24 and a locking screw 34 passes through said slot and engages a tapped hole in block 26 so that when screw 34 is turned down, block 26 is firmly clamped to plate 2 in the position of adjustment determined by element 29. It will be noted that as adjustment and clamping are effected from the lower surface of plate 2 access to the interior of the range finder is unnecessary for this purpose.

An upstanding bracket 35 is formed integrally with or rigidly attached to block 26 at its rear edge. At its top, this bracket carries a pair of spaced pins 36 and 37 slidably received in respective bores in an upper block 38. As shown best in Figs. 7 and 9, coil springs 39 and 40 surround the respective pins 36 and 37 and engage the bottoms of the bores in block 38 to urge said block away from bracket 35. This movement is prevented by a screw 41 that extends loosely through a hole in bracket 35 between pins 36 and 37 and engages a tapped hole in block 38. Blocks 26 and 38 have parallel confronting grooves or channels 56 and 57 as shown in Fig. 10, adapted to receive the opposite edges of a reflector or mirror 4. Any play or looseness of the reflector within the grooves is taken up by a leaf spring 43 attached to bracket 35 by a rivet 44 and having its ends positioned to exert pressure against the back surface of the mirror. Thus, by turning screw 41, reflector 4 can be adjusted to a position exactly perpendicular to plate 2, and, by loosening screw 34 and turning element 29, the angular relation between mirror 6 and reflector 4 can be varied in a precise and exact manner.

As shown in Figs. 7 and 8, two totally reflecting mirrors 4 and 5 are used, each being wholly independent of the other. As the parts are duplicates, detailed description of the second mirror and its mounting is considered unnecessary. The mounting parts of mirror 5 are identified by the same numerals, primed, as have been used in the description of the mounting for mirror 4. From Fig. 7 it will be noted that the two pivot screws 25 and 25', are located in adjacent positions and that reflectors 4 and 5 are pivoted in opposite directions to make small angles with mirror 6. The mirror mounting just described is claimed in my application, Serial Number 85,402, filed April 4, 1949, which is a true division of the present application.

Fig. 5 shows a cover 3 adapted to fit over and above base plate 2 to enclose and protect the optical parts. This casing is secured in place by means of screws 46 passed through holes 47 in depending side portions of the casing and into threaded holes in plate 2. As shown at Figs. 5, 7 and 10, the top of the casing is provided with a hood portion 48 extending forwardly over the front viewing opening. This opening is closed by a transparent pane 49 held in position against a flange 50 by screws 51. Thus when cover 3 is secured in place, all optical parts are protected.

In calibrating the instrument, it is convenient to provide a pair of targets such as 52 and 53, Fig. 11, separated by a known distance such as the wing spread of an enemy aircraft expected to be engaged. A first point is located at a distance from said targets equal to the optimum range at which the enemy aircraft should be engaged. This distance is, of course, measured along a line at right angles to a line connecting the targets. A second point is located along the line at a different distance. This second distance may be the optimum range at which the enemy craft should be attacked with a different type or calibre of projectile. Alternatively, of course, the two reflectors may be set for two different types of enemy craft in which event one target 53 should be movable toward or from the other for the second calibration, while a second point may be located along the line at the optimum range at which fire should be opened on the second type of craft.

An observer takes his position at the first point and places the goggles in position. He will see the two targets 52 and 53 directly through the mirror 6 and, ordinarily, a pair of images such as 54 and 55, at both sides of the real targets. Screws 34 and 34' are loosened and element 29 is turned until images 54 appear to merge with target 53 to give the appearance shown in Fig. 12. Screw 34 is then tightened to secure block 26 in this correctly-adjusted position. The observer then takes position at the second point and adjusts element 29' until one of the two images that ordinarily will be seen at the left of target 52, appears to merge with target 52. Locking screw 34' is then tightened and the instrument is properly adjusted.

In use, when an enemy aircraft is to be engaged and is identified as one for which the goggles have been calibrated, the pilot or gunner dons the goggles and, assuming that the enemy is coming head-on or is being pursued, fire is opened at the instant that the adjacent tips of the actual craft and its image appear to touch. In case the goggles are set for determining two ranges of the same target or object, then, by noting the time taken to pass from one range to the other, the time necessary to reach the target may be estimated or determined. In fact, a stop watch might be graduated to give directly the time necessary to reach the target on the basis of the elapsed time between the two aforesaid ranges. For example if $t$ is the elapsed time in passing from the first predetermined range R, to the second range $R_1$, then assuming constant velocities, the time $t_1$ to reach the target from range $R_1$ is $t_1 = kt_2$, where $k = R_1/R - R_1$.

The device is susceptible of various uses. For example, it may be used to determine the same range for two different objects, such as two types of enemy aircraft, or it may be used to determine two different ranges for two different types of craft. While the device may perhaps find its greatest usefulness in engagements between aircraft, particularly toss bombing, it is obviously useful in any situation where a known range is to be determined by means of a known observable dimension upon the object whose range is to be determined. Hence the foregoing description is to be taken as illustrative and not in a limiting sense. I wish to reserve all modifications, substitutions of equivalents and alterations that fall within the scope of the subjoined claims.

Having fully disclosed the invention, what I claim and desire to secure by Letters Patent is:

1. A pair of range finder goggles for wear upon the head of an observer, including a frame having viewing apertures for each eye, a transparent pane secured to said frame over one aperture a range finder casing secured over the other aperture, said casing defining a plane, a partial reflector secured in said casing perpendicularly to a predetermined plane fixed with respect to said casing and at approximately 45° across a line of sight therethrough, first and second total reflectors mounted in said casing perpendicularly to said plane in end-to-end relation for pivotal movement about spaced parallel axes normal to said plane, said total reflectors being offset from said partial reflector in a direction transversely of said line of sight and parallel with said plane and arranged at adjustably fixed small angles with respect thereto, the construction and arrangement being such that a pair of images of an object may be observed on said mirror simultaneously with direct observation of said object therethrough.

2. In a stadia type range finder, a base, a partially-reflecting first mirror fixedly carried by said base at 90° to a predetermined plane and at 45° across a line of sight therethrough parallel with said plane, second and third mirrors carried by said base in closely spaced relation with said first mirror, said second and third mirrors being at 90° to said plane and offset from said first mirror in a direction transversely of said line of sight and parallel with said plane, said second mirror being inclined in one direction at a small angle to said first mirror about a first axis normal to said plane, said third mirror being inclined in the opposite direction at a different small angle to said first mirror about a second axis normal to said plane, said mirrors being so constructed and arranged that discrete relatively displaced images of a remote object are reflected onto said first mirror by said second and third mirrors as said object is viewed directly through said first mirror along said line of sight.

3. A range finder as recited in claim 2, and means mounting said second and third mirrors for pivotal movement about said first and second axes, respectively and about axes parallel with the intersection of the respective planes of said mirrors and said predetermined plane.

4. A range finder comprising a base defining a plane, a first plane partial reflector fixed at 90° to said base and at 45° to and across a line of sight parallel to the plane of said base, a pair of totally reflecting mirrors fixedly mounted end-to-end on said base at 90° to the plane thereof each said totally-reflecting mirror being laterally offset from said partially-reflecting mirror and the line of sight therethrough, said totally reflecting mirrors being positioned at different small angles to said partially-reflecting mirror, and so constructed and arranged that light from a remote object viewable directly through said partial reflector along said line of sight will be reflected by said totally-reflecting mirrors onto said partially-reflecting mirror and thence along the line of sight.

5. In a telemeter, a support defining a plane, a first partial reflector secured to said support in position perpendicular to said plane and at 45° across a line of sight parallel with said plane, and first and second total reflectors fixed to said base in position such that light from a remote object when viewed directly through said partial reflector along said line of sight, will be reflected by one of said first and second reflectors onto said partially reflector and thence along said line of sight away from said object, to form images of said object, said object being at a known range when said object and a respective one of said images are in predetermined apparent relations as viewed through and on said partial reflector.

6. A stadia type range finder comprising a casing having a base plate defining a plane, a plane partial reflector fixedly carried on said plate perpendicular thereto and at 45° to and across a line of sight parallel with said plate, a pair of plane total reflectors fixed on said base plate perpendicular thereto and making small angles with said partial reflector, said total reflectors being offset from said partial reflector transversely of said line of sight in a direction parallel with said plane, and so constructed and arranged as to reflect images of a remote object onto said partial reflector and thence along the line of sight in predetermined apparent relations with said object as viewed directly through said partial reflector, said relations obtaining only when said object is at a corresponding known range.

WILLIAM L. WHITSON.

REFERENCES CITED

The following references are of record in the file of this patent:

UNITED STATES PATENTS

| Number | Name | Date |
|---|---|---|
| 23,294 | Villeroi | Mar. 22, 1859 |
| 738,155 | Brown et al. | Sept. 8, 1903 |
| 1,033,848 | Washburn | July 30, 1912 |
| 1,529,292 | Benford | Mar. 10, 1925 |
| 1,605,725 | Herbert | Nov. 2, 1926 |
| 1,869,512 | Schnabl | Aug. 2, 1932 |
| 1,968,002 | Nowicki et al. | July 24, 1934 |
| 2,128,791 | Benford | Aug. 30, 1938 |
| 2,242,452 | Cazin | May 20, 1941 |
| 2,352,644 | Linderman et al. | July 4, 1944 |
| 2,357,377 | Bausch | Sept. 5, 1944 |
| 2,401,746 | Castedello | June 11, 1946 |

FOREIGN PATENTS

| Number | Country | Date |
|---|---|---|
| 298,495 | Germany | Oct. 31, 1919 |
| 278,219 | Germany | Sept. 24, 1914 |